United States Patent [19]

Okabe

[11] Patent Number: 4,539,001
[45] Date of Patent: Sep. 3, 1985

[54] TENSIONING DEVICE FOR BELT OR THE LIKE

[75] Inventor: Yoshio Okabe, Kariya, Japan

[73] Assignee: Aisin Seiki Kabushiki Kaisha, Kariya, Japan

[21] Appl. No.: 567,159

[22] Filed: Dec. 30, 1983

[30] Foreign Application Priority Data

Dec. 31, 1982 [JP] Japan ................... 57-230811

[51] Int. Cl.³ .............................. F16H 7/08
[52] U.S. Cl. ................... 474/138; 474/110
[58] Field of Search ............ 474/110, 111, 109, 115, 474/117, 138, 136, 103, 104, 135, 101; 198/814; 248/562, 565; 267/124; 188/297

[56] References Cited

U.S. PATENT DOCUMENTS 3,574,418 4/1971 Okabe ................ 474/110 X
4,190,025 2/1980 Wahl ................. 474/110 X

FOREIGN PATENT DOCUMENTS 849938 9/1952 Fed. Rep. of Germany ...... 474/110

Primary Examiner—Stephen I. Novosad
Assistant Examiner—Thuy M. Bui
Attorney, Agent, or Firm—Oblon, Fisher, Spivak, McClelland & Maier

[57] ABSTRACT

A hydraulic autotensioner of a sealed type is used to give tension to a belt or a chain. The hydraulic autotensioner includes a body member having a large diameter oil chamber, a plunger having a small diameter oil chamber and a small passage, a piston whose head extends outside the body member and a spring for biasing the plunger.

5 Claims, 3 Drawing Figures

TENSIONING DEVICE FOR BELT OR THE LIKE

BACKGROUND OF THE INVENTION

1. Field of the Invention

This invention relates to tensioning devices in general, and more particularly to a tensioning device or autotensioner for a tensioned belt, chain or the like.

2. Description of the Prior Art

For a belt tensioner, in an automobile belt transmission device there has been developed a hydraulic tensioner or autotensioner of the force-feed type. The hydraulic tensioner of the force-feed type must be arranged in an oil pan or reservoir due to the leakage of oil out of the tensioner. Especially when an automobile timing belt is arranged outside the oil pan, it is impossible to use a hydraulic tensioner of the force-feed type because of such oil leakage.

On the other hand, a hydraulic autotensioner of the sealed type has been well known. In such a known tensioner, a plunger stroke in the large diameter side of the hydraulic tensioner does not result in a long piston stroke in the smaller diameter side of the tensioner.

To provide a solution to these problems, there is herein described a hydraulically operated tensioner for varying a stroke of the piston in accordance with a stroke of the plunger. By the use of such a hydraulic tensioner, the stroke of the piston can become long.

SUMMARY OF THE INVENTION

It is a principal object of the invention to provide a hydraulic tensioner having a long stroke of the piston for a short stroke of the plunger.

It is another object of the invention to provide a hydraulic tensioner having a damper effect against the push back force of the piston.

According to the invention, a hydraulic autotensioner of a sealed type includes a body member having a large diameter oil chamber, a plunger inserted in a movable manner in the body member and having a small diameter oil chamber therein, and a small passage which is in communication with the large diameter oil chamber. A piston is inserted in the plunger and has a head which extends outside of the body member. A spring is provided for biasing the plunger in the direction of the large diameter oil chamber and a snap ring is arranged at an opening of the body member.

BRIEF DESCRIPTION OF THE DRAWINGS

These and other objects and advantages of the invention will become apparent from the following drawings wherein.

DETAILED DESCRIPTION OF THE PREFERRED EMBODIMENTS

Figure 1:
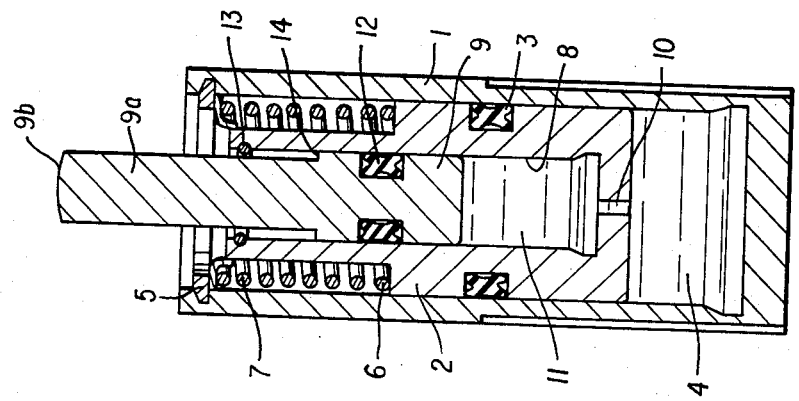
FIG. 1 is a sectional view of a first embodiment of the invention.

Referring to FIG. 1, there is illustrated a sectional view of the first embodiment of the hydraulic autotensioner. A plunger 2 is inserted in a movable manner inside of a hollow body member 1 of the autotensioner. In the bottom of the body is formed a large diameter oil chamber 4 where oil is sealed by means of an annular seal member 3.

The plunger 2 is biased in the direction of the large diameter oil chamber 4 by means of a spring 7 installed between a snap ring 5 attached to an open end of the body member 1 and a shoulder of the plunger 2.

A piston 9 is inserted in a movable manner in a bore 8 bored in the center of the plunger 2. In the bottom of the bore 8 is formed a small diameter oil chamber 11, the chamber 11 being in communication with the large diameter oil chamber 4 by means of small diameter hole 10.

The small diameter oil chamber 11 is sealed by means of an annular seal member 12 and cannot be communicated with the outside. A snap ring 13 is attached to an end opening of the bore 8. The snap ring 13 can come into contact with a step 14 of the piston 9, and this contact prevents the piston 9 from moving entirely outside of the bore 8. A head 9a of the piston 9 extends outside body member 1, the end face of 9b, and 9a defining a press face of the hydraulic autotensioner.

When using the device described above as a hydraulic autotensioner for a belt, the head end face 9b is pressed against the belt face, either directly or indirectly by means of another member.

The pressing force of the autotensioner against the belt or the other member results from the biasing force of the spring 7 transferred to the piston 9 through the oil in chambers 4 and 11. The piston 9, on the other hand, is pushed back by the belt face. The resistance of the autotensioner to the force of this belt face is a function of the biasing force of the spring 7, the compressability of the oil and the resistance of the small diameter hole 10 to the passage of oil.

Figure 2:
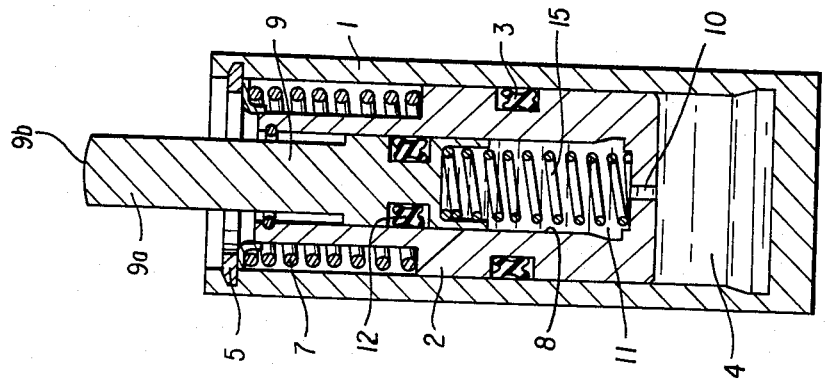
FIG. 2 is a sectional view showing a second embodiment of the invention.

FIG. 2 illustrates another embodiment of the present invention. Between the bottom of the small diameter oil chamber 11 and the piston 9, there is a spring 15 biasing the piston 9 to the outside. The spring 15 increases the outward pushing force applied to the piston 9 and the resistance to a belt force pushing the piston 9 back into the housing.

There is otherwise no difference in operation between the embodiment of FIG. 1 and that of FIG. 2.

Figure 3:
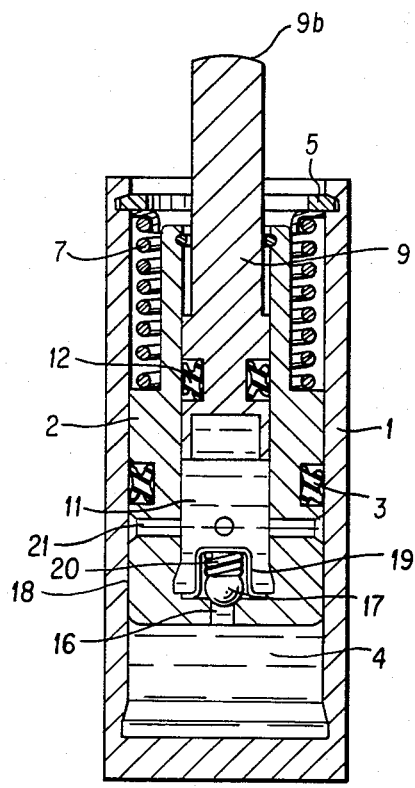
FIG. 3 is a sectional view showing a third embodiment of the invention.

FIG. 3 illustrates a further embodiment of the present invention. At the bottom of the small diameter oil chamber 11 is positioned a check valve to control the opening and closing of the passage 16 between the small diameter oil chamber 11 and the large diameter oil chamber 4. The large diameter oil chamber 4 for forming a reservoir and the small diameter oil chamber 11 for forming a pressure chamber are also communicable by means of the leak clearance 18 which is established between the body member 1 and the plunger 2, thus adding the function of a hydraulic lifter to the hydraulic autotensioner. The check valve is constructed by retainer 19 secured at the bottom of the small diameter oil chamber 11; a ball 17 of the check valve is biased by the spring 20 toward a valve seat to close the passage 16. Upon inward pressure on the piston 9, oil passage from chamber 11 to chamber 4 is permitted only via passages 21 and leak clearance 18, thereby providing increased resistance to belt pressure on the piston 9, as compared to the degree of resistance to oil flow from chamber 4 to chamber 11 via passage 16.

The small diameter oil chamber 11 is in communication with the leak clearance 18 by means of the passages 21.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic autotensioner of a sealed type comprising:
   a body member defining a large diameter oil chamber;
   a plunger sealingly inserted in a movable manner in said body member, said plunger having a small diameter oil chamber formed in the center thereof and a small passage which communicates said large and small diameter oil chambers;
   a piston sealingly inserted in said plunger in a movable manner, said piston having a head extending outside of said body member, said piston head having an end face defining a press face;
   a spring in said body member for biasing said plunger in the direction of said large diameter oil chamber; and
   a snap ring arranged at an opening of said body member and engaging said spring.

2. A hydraulic autotensioner of a sealed type according to claim 1 including a second spring in said small diameter oil chamber for biasing said piston outside of said body member.

3. A hydraulic autotensioner of a sealed type according to claim 1 including a check valve at the bottom of said small diameter oil chamber to control opening and closing of said passage.

4. The hydraulic autotensioner of a sealed type according to claim 1 in combination with a belt, wherein said press face forcibly contacts said belt.

5. The hydraulic autotensioner of a sealed type according to claim 1 in combination with a chain, wherein said press face forcibly contacts said chain.

* * * * *